Jan. 11, 1927. Re. 16,533

R. SLOTE

BELT BUCKLE

Original Filed August 31, 1923

WITNESSES

Frank L. Fagiani

L. W. Rooter

INVENTOR

Reuben Slote,

BY Munn & Co

ATTORNEYS

Reissued Jan. 11, 1927. Re. 16,533

UNITED STATES PATENT OFFICE.

REUBEN SLOTE, OF MOUNT VERNON, NEW YORK.

BELT BUCKLE.

Original No. 1,555,764, dated September 29, 1925, Serial No. 660,388, filed August 31, 1923. Application for reissue filed January 13, 1926. Serial No. 81,112.

The present invention relates to new and useful improvements in separable fasteners, and it pertains more particularly to belt buckles especially adapted for personal wear.

Belt buckles comprising two interengaging members are not new, and such belt buckles are very efficient where the belt is employed for the supporting of garments and the two members of the buckle are under constant strain. Belt buckles of this type, however, are not practical for use as trimming for a garment when no garment-supporting function is involved, and it is one of the primary objects of this invention to construct a belt buckle of this type in such a manner that the interengaged parts will at all times be retained in true or proper interengaged relation.

It is a further object of the invention to construct a belt buckle of the above-mentioned type in such a manner that its interengaged parts although securely held in interengaged relation are capable of ready disengagement for the purpose of opening and closing the buckle.

With the above and other objects in view, reference is had to the accompanying drawings, in which Figure 1 is a view in front elevation of a buckle constructed in accordance with the present invention;

Referring more specifically to the drawings the buckle comprises two members 5 and 6, and each of such members is provided with a strap-attaching eye 7, 8, respectively.

Figure 1:
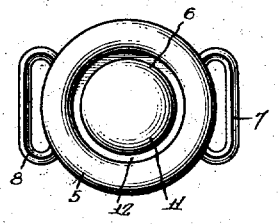
Figure 2:
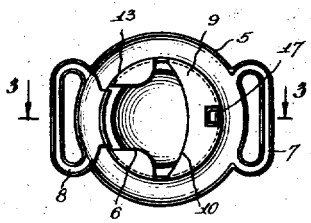
Figure 2 is a view in rear elevation thereof.
Figure 3:
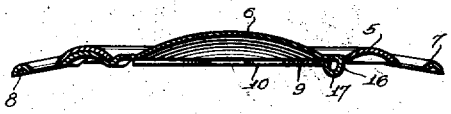
Figure 3 is a detail sectional view taken on the line 3—3 of Figure 2.
Figure 4:
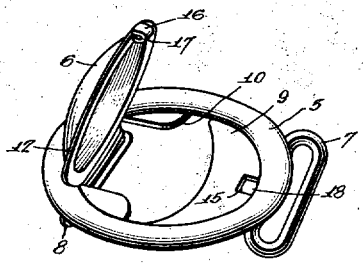
Figure 4 is a perspective view of the parts in open interengaged position.

The member 5 is formed with a depressed portion 9 and a cut-out portion forming a substantially T-shaped slot 10. The member 6 has a circular head portion 11 defined by a flange 12 adapted to seat in the depressed portion 9. The strap-attaching eye 8 of the member 6 is spaced from the head portion thereof by a contracted neck portion 13. The head portion of the member 6 is adapted to be passed through the T-shaped slot and the member 6 is adapted to be moved downwardly until its flange 12 seats in the depressed portion 9 of the member 5, as shown in Figures 1 to 3. To secure the two members of the buckle in this position, the depressed portion 9 of the member 5 is formed with a cut-out portion 15 and the flange 12 of the member 6 is formed with a projecting tongue 16 rolled backwardly upon itself as indicated by the reference character 17 to provide a resilient catch member adapted to engage the wall 18 of the cut-out portion 15 to provide a snap catch.

By this construction it is apparent that when the head member 6 is seated with its flange in engagement with the depressed portion 9 of the member 5 and the resilient tongue 16 is passed into engagement with the wall 18 of the cut-out portion 15, the catch serves to secure the two members in position and prevent accidental displacement.

The broad idea of my invention is to provide a buckle of the type described in which the members are removably secured against accidental displacement when they are in coupled relationship, and while I have set forth a particular means for this purpose, including the spring tongue 16 and the opening 18, I do not wish to be limited to this particular coupling means nor do I wish to be limited to the shape of the coupled members of the buckle, as this may be varied to suit the trade.

The foregoing construction provides a buckle which will maintain a rigid position without placing the parts thereof under strain, thus rendering the buckle particularly useful in connection with belts used merely as trimmings for garments instead of supports therefor.

I claim:

1. A buckle, comprising a member having in its outer face a circular depression provided in its bottom with a substantially T-shaped slot and an opening at the peripheral face of the depression, the member being provided with a strap-attaching loop, and a second member having a circular head defined by a flange of a size to fit snugly in the depression of the first member, said member being provided with a strap-attaching loop connected thereto by a neck and on the under face of the flange of its head at the periphery thereof with a resilient catch for engaging the opening of the first member to lock the said members together.

2. A buckle, comprising a base having a depression therein, and provided in the bottom of the depressed portion with a substantially T-shaped unobstructed slot, a second member having a head adapted to fit within the depressed portion of the other member, a neck portion fixed to the head and movable in the slot to position the head within the depression or permit the release of the head therefrom, the periphery of said head and the wall of the depression being concentric, means for securing the head member in the socket member, said means comprising one member of a snap fastener located at the edge of the head for cooperative engagement with the other member of a snap fastener located in the socket member.

REUBEN SLOTE.